United States Patent [19]

Walsh

[11] Patent Number: 4,972,748

[45] Date of Patent: Nov. 27, 1990

[54] PORTABLE TABLE FOR CIRCULAR SAW AND OTHER POWER TOOLS

[76] Inventor: Joseph P. Walsh, 3614 Roland Ave., Baltimore, Md. 21211

[21] Appl. No.: 394,056

[22] Filed: Aug. 14, 1989

[51] Int. Cl.⁵ .............................................. B27B 5/20
[52] U.S. Cl. ................................ 83/468.3; 83/471.3; 83/486.1; 83/522.25; 83/574
[58] Field of Search ................... 83/471.3, 574, 468.3, 83/581, 486.1, 522.17, 522.18, 522.25, 473

[56] References Cited

U.S. PATENT DOCUMENTS

| | | |
|---|---|---|
| 2,595,322 | 5/1952 | Avery . |
| 2,633,162 | 3/1953 | Nevenschwander ........... 83/471.3 X |
| 2,655,955 | 10/1953 | Dziengiel, Jr. . |
| 2,770,265 | 11/1956 | Pollock .............................. 83/468.3 |
| 2,803,271 | 8/1957 | Shaw ................................. 83/508.1 |
| 2,818,892 | 1/1958 | Price ................................. 83/574 X |
| 2,911,017 | 11/1959 | Holder ............................... 83/574 |
| 3,066,710 | 12/1962 | Silken . |
| 3,195,591 | 7/1965 | Haberman .......................... 83/477.2 |
| 3,866,496 | 2/1975 | Payne et al. ....................... 83/471.3 |
| 3,872,755 | 3/1975 | Marsh et al. ...................... 83/471.3 |
| 3,896,692 | 7/1975 | Stubbs .............................. 83/471.3 |
| 3,955,456 | 5/1976 | Van Cleave ....................... 83/471.3 |
| 3,991,643 | 11/1976 | Girardin ............................ 83/564 |
| 4,024,783 | 5/1977 | Sturgis ............................. 83/471.3 X |
| 4,181,057 | 1/1980 | Bassett ............................. 83/486.1 |

OTHER PUBLICATIONS

"A Revolutionary Machine for the Craftsman", DeWalt, 1987 Black & Decker Form No. 11261.
Catalog "Delta Industrial Machinery", 2/88.

Primary Examiner—Frank T. Yost
Assistant Examiner—Eugenia A. Jones
Attorney, Agent, or Firm—Stevens, Davis, Miller & Mosher

[57] ABSTRACT

A portable table for use with a circular saw and other power tools is disclosed permitting the use of the power tool at selected angular orientations to the workpiece. The construction of the portable table permits the use of circular saw blades of different diameters at angular orientations extending from rip cuts to cross cuts. The table includes a novel locking mechanism to maintain a predetermined angular orientation of power tool and work. The work may be positioned against a removable or fixed fence provided on the portable table. A counterbalance mechanism assists in supporting the weight of the power tool and its guide. The portable table includes a provision to place the power tool guide in parallel relationship to the removable and/or fixed fences so as to facilitate storage of the table.

21 Claims, 3 Drawing Sheets

FIG. 3
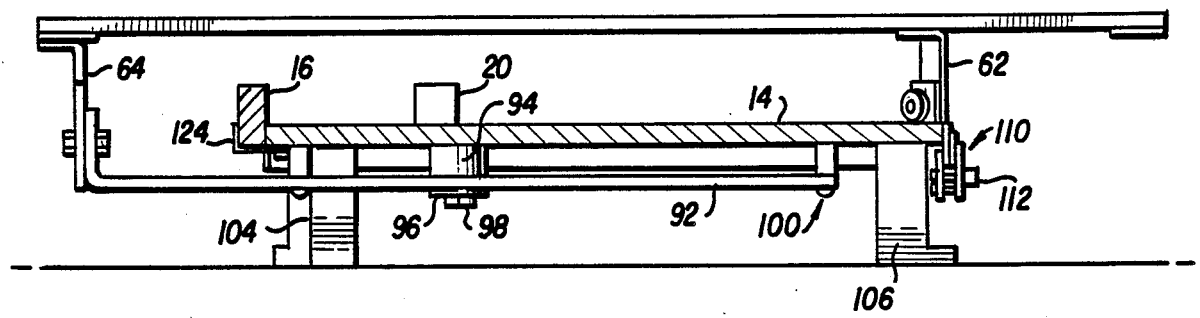
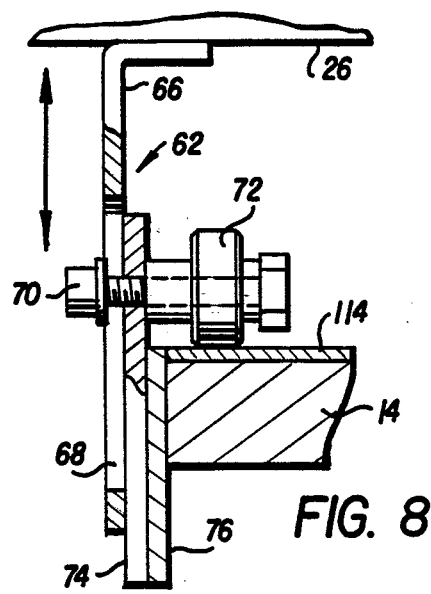
FIG. 8
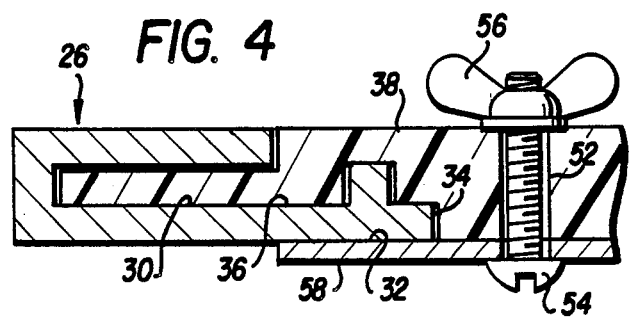
FIG. 4
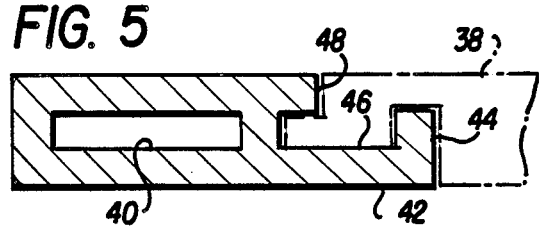
FIG. 5
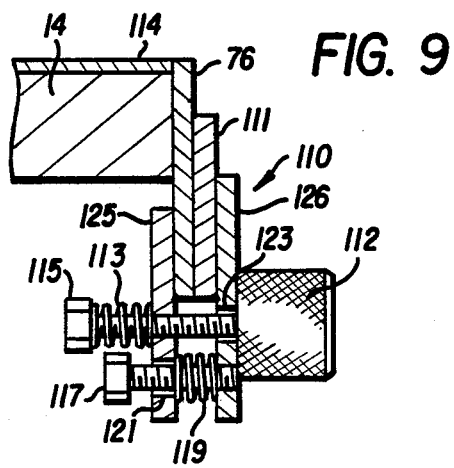
FIG. 9
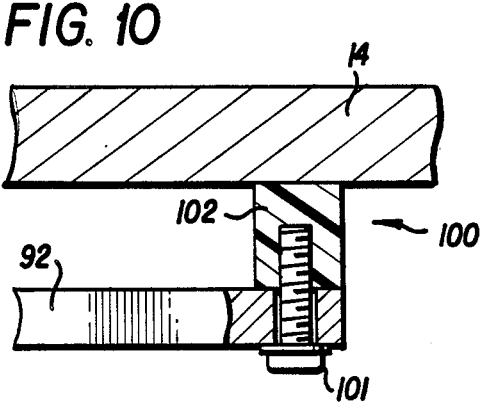
FIG. 10

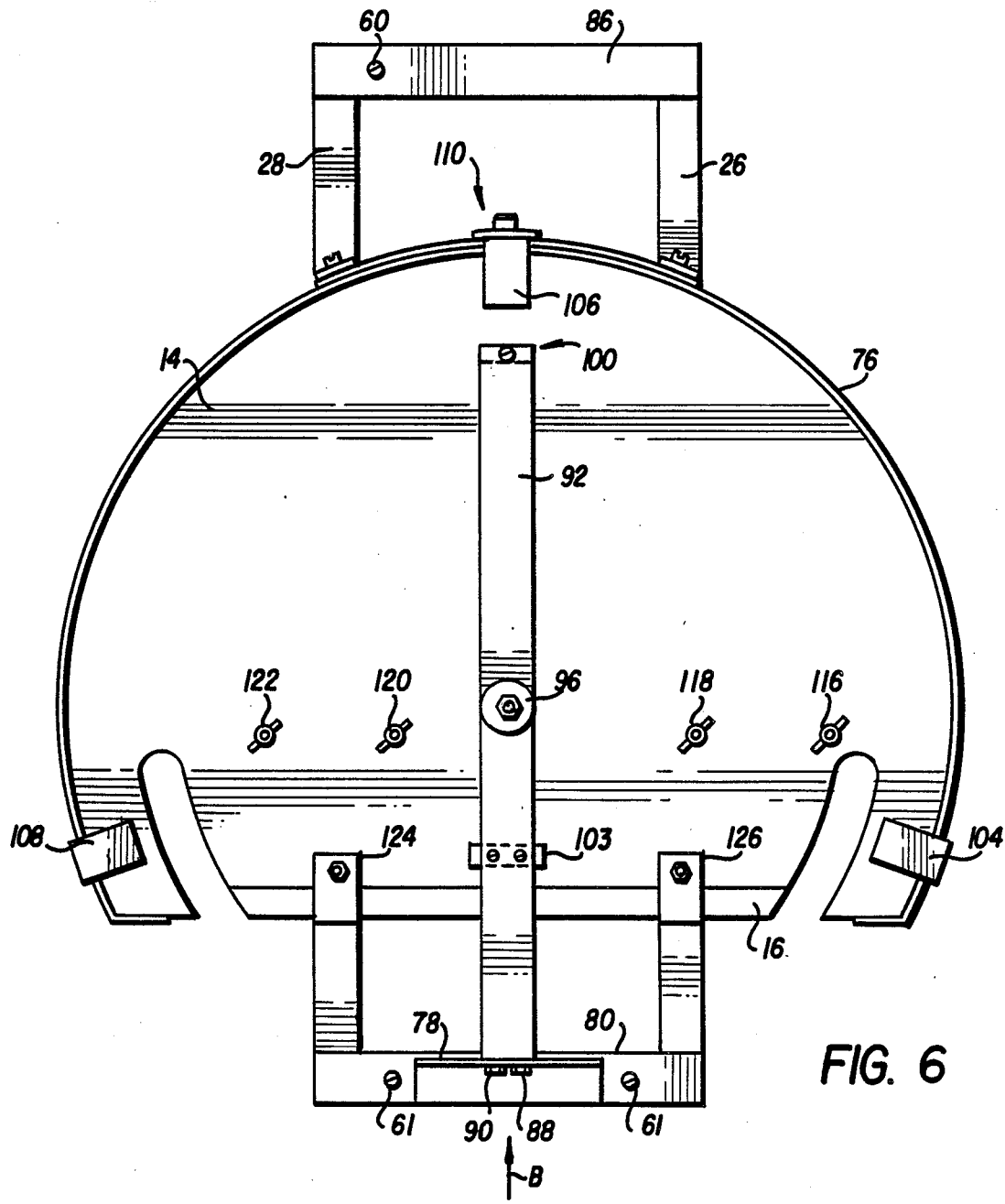
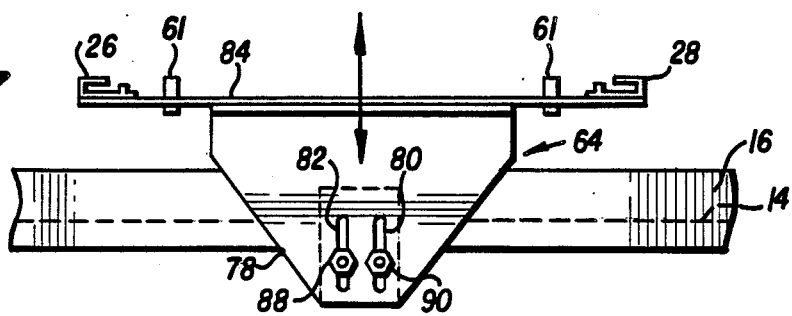
FIG. 6
FIG. 7

PORTABLE TABLE FOR CIRCULAR SAW AND OTHER POWER TOOLS

BACKGROUND OF THE INVENTION

The art of carpentry has a long history, most of which employed the use of hand-powered tools such as a cross-cut hand saw. In using such a saw to cut lumber at an angle to the grain, carpenters have employed saw guides known as miter boxes to position the saw blade with regard to the work to be cut.

Although hand-powered carpenters, tools are still employed, their use has slowly given way to the use of powered tools driven by electric, pneumatic, or other power sources. These powered tools, including power saws, take various forms such as radial saws (also sometimes called radial arm saws), table saws, band saws and circular saws. By far, the most portable of these powered saws is the circular saw, which is well known in the art and conventionally powered by an electric or pneumatic source. These circular saws, which come in different saw blade sizes such as the six and one-half inch, seven inch, seven and one-quarter inch, seven and one-half, eight, eight and one-quarter, ten and one-quarter and sixteen inch saw blade sizes, are portable, permitting their use at a job site by journeymen carpenters as well as finding increased acceptance by the do-it-yourself homeowner or apartment dweller who has only an occasional need to cut lumber.

It has been customary in the past to scribe the lumber with a mark which acts as a guide for aligning either the blade, or a guide provided for this purpose on the saw, when using a powered saw to cut lumber. This prior practice is disadvantageous for several reasons. Firstly, the lumber must be scribed along its entire portion of the section to be cut, which introduces error not only in the measurement and scribing of the mark, but also entails the additional step of accurately scribing the position of the cut. Secondly, the accuracy of the cut along the scribed mark depends to a great degree not only on the skill of the carpenter to accurately align the saw blade, or guide on the saw, with the scribed mark, but also his skill in preventing deviation of the saw cut from its intended course as the saw blade traverses the work.

Thus, it would be advantageous to employ a guide means for the circular saw in a manner similar to that provided by the miter box for use with the hand saw.

Various attempts to provide a guide for power saws have been made in the past as illustrated in U.S. Pat. No. 2,595,322. Therein is disclosed a device for guiding a power saw at various angles ranging from 45 degrees to the grain of the lumber to normal to the grain. The device was adapted to mount to a conventional miter box of the type employed for use with hand saws, and had significant drawbacks. Among these are that the width of the work to be cut is limited by the size of the conventional miter box, and as the width of the miter box increased to accommodate larger width lumber, the size of the miter guide approximately doubled, producing an unduly heavy and cumbersome miter guide with ineffective cutting width for its size and an angular limitation of only 45 degrees to the grain of the lumber.

Additional attempts at providing a portable miter box for use with power-driven saws is illustrated in U.S. Pat. No. 2,633,162, but suffered from the same disadvantages of being unduly cumbersome in size and weight and being limited to a 45 degree angular cut to the direction of the grain of the lumber. Further attempts at providing a guide or support for power saws can be found in U.S. Pat. Nos. 2,770,265; 2,803,271 and 3,066,710. None of these devices overcame the problems of an unduly heavy construction of the guide and limited width and angular cut of the workpiece.

By far, the best attempt at providing a portable table for a circular saw is illustrated in U.S. Pat. No. 3,195,591, the entire disclosure of which is herein incorporated by reference. This disclosure provides a portable table which is a segment of a semi-circle having a pivoted saw guide, wherein the saw blade is traversable along the length of the table from an area near its outer peripheral edge through the pivot portion of the saw guide. However, this device, like those of the prior art previously discussed, is limited in its angular cut to 45 degrees to the grain of the workpiece and its effective width of cut, although an improvement over the prior art previously discussed, is also limited by the construction of the portable table and the guide. Furthermore, the saw guide was not rigid because the locking depended on point contact of an adjustable threaded member applying pressure to the periphery of the table. This point contact prevented the maintenance of the guide means at its intended angular orientation to the workpiece. Additionally, this device did not permit the employment of power saws of various saw blade sizes, nor did its construction facilitate storage of the table when not in use. The ease of storage is an important consideration, especially for the apartment dweller who normally has limited storage areas, such as small closets or storage bins.

Thus, despite a long-felt need in the art, there has not been provided a portable table for guiding power tools, such as a circular saw, that provides a large angular cut relative to the grain of the workpiece and yet is compact, facilitating its storage.

OBJECTS OF THE INVENTION

One object of the present invention is the provision of a portable table which overcomes the deficiencies of the prior art noted hereinabove.

Another object of the invention is the provision of a portable table for use with a powered circular saw and other non-hand-powered tools, such as a router or power drill.

A further object of the invention is to provide a mechanical means for guiding a non-hand-powered cutting tool through a workpiece in a specific angular orientation to the grain of the work.

An additional object of the invention is to provide a portable saw table based upon a three-fourth round circle, or in other words, having an outer periphery spanning 270°.

A further object of the invention is the provision of a portable saw table having two fences, e.g., removable and fixed fence means for positioning of a workpiece.

A still further object of the present invention is the provision of a removable fence positioned over the pivot point of a saw guide which is pivotable over a portable saw table relative to the workpiece and a removable fence placed parallel to, but spaced from, the fixed fence.

A still further object of the invention is the provision of a portable work table wherein the guide means for the non-hand-powered tools can be rotated from a position parallel to the removable and fixed fence means to an angle 90 degrees past normal to the grain of the workpiece.

A further object of the present invention is the provision of a novel power saw guiding apparatus including means to prestress the guide means to support the weight of the power saw.

A still further object is the provision of a counterbalance for the weight of the power tool and its associated guide means.

These and other objects of the invention will become apparent from the following detailed description of the invention.

BRIEF DESCRIPTION OF THE DRAWINGS

The foregoing objects of the present invention, together with other objects and advantages attained by its use, will become more readily apparent upon reading the following description of the invention, taken in conjunction with the drawings.

In the drawings, wherein like reference numerals identify corresponding elements:

FIG. 3 is an enlarged longitudinal cross-sectional view taken substantially along line 3—3 of FIG. 1, with parts broken away for illustrative clarity;

FIG. 4 is an enlarged fragmentary cross-sectional view taken substantially along line 4—4 of FIG. 1, illustrating the guide rail means of the present invention;

FIG. 5 is a cross-sectional view of an alternative guide rail means of FIG. 4;

FIG. 6 is a bottom plan view of the portable table shown in FIG. 1;

FIG. 7 is a side view of FIG. 6 taken along line B of FIG. 6;

FIG. 8 is an enlarged fragmentary view of section C—C of FIG. 3;

FIG. 9 is an enlarged fragmentary view of section D—D of FIG. 3; and

FIG. 10 is an enlarged fragmentary view of section E—E of FIG. 3.

DETAILED DESCRIPTION OF THE INVENTION

Figures 1, 2:
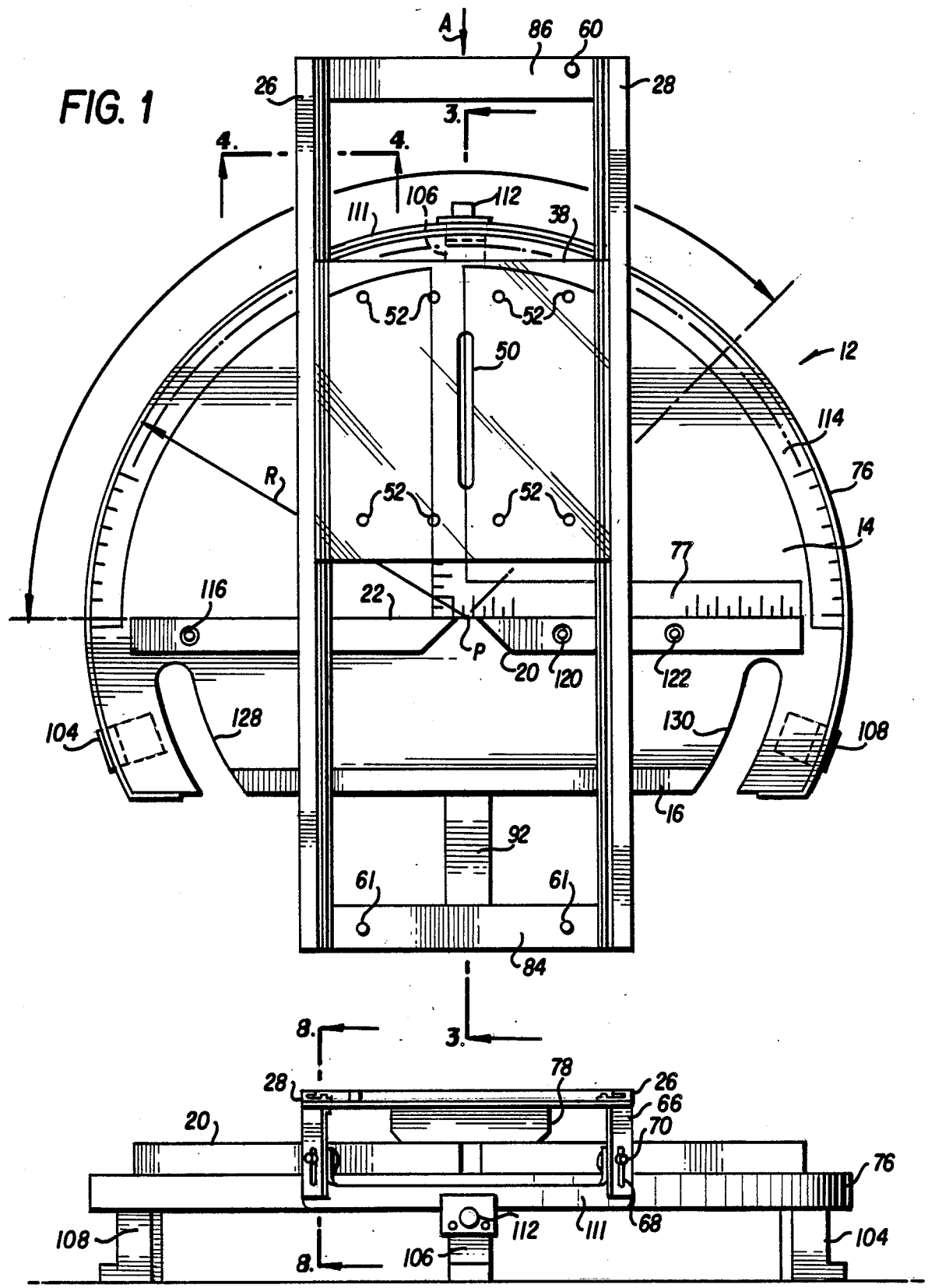
FIG. 1 is a top plan view of a portable work table according to the present invention.
FIG. 2 is a side view taken along line A of FIG. 1.

Referring now to the drawings in general and more particularly to FIG. 1, reference numeral 12 generally designates a portable table in accordance with the present invention.

The portable table comprises a base 14 formed of a material sufficiently rigid to support the work, but also soft to avoid damage to the cutting tool in the event of contact between the cutting tool and table. Composite materials such as reinforced plastics, soft metals and composite wood material such as plywood are suitable materials for use as base 14, with plywood being preferred. The periphery of the base 14 is substantially the same as the periphery of a circle generated by movement of radius R about pivot point P, but including a straight edge defined by a chord joining the 0 degree and 270 degree periphery of a circle generated by movement of such a radius R about pivot point P. Along this chord is positioned fixed fence 16. A removable fence generally illustrated at 18 comprising removable fence sections 20 and 22 lies along a diameter of the circle passing through pivot point P in an orientation parallel to that of fixed fence 16.

Mounted above base 14 is power tool guide means 24 comprising guide rails 26, 28. Guide rails 26 and 28 are formed of metallic elements, preferably extruded aluminum, of the general shape as illustrated in FIGS. 4 and 5. As shown in FIG. 4, the extruded shape has a C-shaped portion 30 and an integral flanged portion 32. A lip 34 extends upwardly from flanged portion 32 to define a channel 36 to form a power tool support bearing and guiding surface. A power tool support 38 (FIG. 1) is shaped to complement the upwardly extending lip 34 and channel 36 as shown more clearly in FIG. 4. The power tool support 38 may be formed of any suitable material such as metal or wood, but preferably is formed of a transparent plastic material, such as methylmethacrylate. The shape of the power tool support 38 is preferably square as will be described hereinafter, but may be rectangular. The power tool support 38 is always provided with an aperture 50 to permit passage of the cutting element from the power tool (not shown) to the work. In FIG. 1, aperture 50 takes the shape of an elongated slot to permit passage of a cutting element such as a circular saw blade. The power tool support 38 contains the elongated aperture 50 to permit passage of the cutting element of the power tool (not shown) to contact the work. However, it is to be understood that the aperture in power tool support 38 may be of any shape and size suitable to permit passage of the cutting element from the power tool (not shown) to the work. In the case of a router or drill bit, the aperture may be circular in shape, of a size sufficient to permit passage of the cutting element through power tool support 38. As illustrated in FIG. 1, power tool support 38, in a preferred embodiment, contains a plurality of holes 52 permitting passage of a fastener such as bolt 54 through the aperture to mount the power tool means (not shown) to the power tool support 38. Suitable nuts 56 (only one of which is shown in FIG. 4) can be used to assure that the power tool (not shown) and power tool support 38 will not be dislodged from guide rails 26, 28 by passing the bolt 54 first through a fastener plate 58, holes 52 and power tool (not shown). Fastener plate 58 overlaps guide rails 26, 28 as illustrated in FIG. 4 and can be tightened by means of nuts 56 and bolts 54 so as to be fixed and immovable with respect to guide rails 26, 28. This is especially important in ripping the work as will be described hereinafter. However, the use of fastener plate 58 is not always necessary. As an alternative to or supplement of the use of fastener plate 58, the first several inches of the top surface (for example, lip 48, FIG. 5) of guide rails 26, 28 can be removed permitting power tool support 38 to be placed directly on the channel portion 46 of rails 26, 28. By moving the power tool support 38 along the direction of arrow A, the power tool support 38 will engage the lip 48 and will be prevented from becoming dislodged from guide rails 26, 28.

As can be appreciated, the foregoing assembly permits slidable movement of the power tool support carrying the power tool along guide rails 26, 28 when nuts 56 and bolts 54 are not present or, if present, not fully tightened. The power tool element can then be accurately reciprocated to any desired position merely by applying a sliding force to the power tool element by the hand pressure of the operator. Stops 60, 61 prevent the reciprocation of power tool support 38 beyond a desired position.

In the alternative embodiment to guide rails 26, 28 as shown in FIG. 4, the guide rail of FIG. 5 has an extruded box-shaped construction containing lip 48 extending from the box portion 40 of the extruded shape overlying channel 46. This construction, in combination with upstanding lip 44 extending from flange 42 provides an alternative means to retain power tool support 38 in contact with guide rails 26, 28. In either of the embodiments of FIGS. 4 or 5, the stops 60, 61 may be placed to prevent the power tool support 38 from being moved beyond the stop. The stops 60, 61 may, of course, be removable to permit placement or removal of the power tool support when the removed upper surface (e.g., lip 48 of FIG. 5) of the guide rail is not provided for this purpose. Positioned in a convenient location for removal and of ordinary construction, e.g., a nut and bolt, stops 60, 61 can be removed to permit withdrawal of power tool support 38 and substitution of a different power tool support 38 carrying alternative power tools. Guide rail means 26, 28 are positioned above base 14 by means of adjustable elements 62, 64 (FIG. 3). As shown more clearly in FIG. 8, element 62 includes an angle iron 66 connected to one of the guide rails 26 or 28, for example 26, and carries an elongated slot for passage of a slotted or Allen-headed fastener 70 to roller 72. Elongated slot 68 in angle iron 66 is movable relative to roller 72, and thus the elevation of guide rails 26, 28 above base 14 can be adjusted. Base 14 may also be provided with a peripheral scale 76 marked in angular notation as will be explained hereinafter. Additionally, a linear scale or square 77 may be embedded in base 14. A yoke 111 is carried adjacent scale 76 to fix the position of guide rail elements 26, 28 with respect to each other as well as to base 14. The yoke 111, working in combination with locking mechanism 110, best illustrated in FIG. 9, accurately maintains the position of the guide rail elements 26, 28 to the workpiece (not shown).

It is preferable to provide the yoke 111 at a position radially outward of the periphery of base 14 such that, upon activation of locking mechanism 110 forcing yoke 111 radially inwardly toward pivot point P, the lower portion of guide rails 26, 28 are placed under compression or prestressed, e.g., guide rails 26, 28 bow upwardly, so as to assist in supporting the weight of the power tool (not shown) and power tool support 38.

The elevating element 64 is best illustrated in FIG. 7 and includes an angle iron 78 having elongated slots 80 and 82 provided therein thus providing elevational adjustment relative to base 14. Angle iron 78 is connected to cross member 84 which positions guide rails 26, 28 in relation to each other as does yoke 111. Cross members 84, 86 may be adjustable but preferably are fixed with relation to guide members 26, 28. Fastening elements 88, 90 are provided for holding elevating element 64 in relation to counterbalance 92 (FIG. 3). Counterbalance 92 is connected to bearing 94 by means of a fastener 98 bearing on washer 96 which is centered on pivot point P. Counterbalance 92 is pivotable about pivot point P and is spaced from the underside of base 14 by means of thruster 100. Thruster 100, secured to counterbalance 92 by fastener 101, which is illustrated more clearly in FIG. 10, comprises a low friction material, such as nylon, which bears against the underside of base 14 which, in conjunction with counterbalance 92, counterbalances the force exerted by the weight of guide rails 26, 28, power tool support 38, the power tool (not shown) carried by the power tool support 38 and their related elements. An additional thruster 103 may be provided as illustrated in FIG. 6. It is to be understood that counterbalance 92 is preferably formed of a rigid material such as metal and that rollers 72 are formed of a tough material such as nylon. Thrusters 100, 103 may also be provided in the form of rollers formed of a material such as nylon if desired. However, other suitable low friction, wear resistant (tough) materials may be substituted for these preferred materials.

It is necessary for base 14 to carry legs 104, 106, 108, so as to permit rotation of counter balance 92 beneath table 14. In this regard, the legs 104, 106, 108, are positioned radially outward of the edge of counterbalance 92 so as to permit unrestricted rotation thereof, see FIG. 6. Although legs 104, 106, 108 are shown as relatively short so as to permit the employment of the portable table 12 on a workbench or other elevated supporting surface, it should be understood that the legs 104, 106, 108 can be elongated to support the portable table directly on the ground, floor or other supporting surface while maintaining the normal working height of the base at about 30" from the supporting surface.

Guide rail members 26, 28 are also provided with an improved locking mechanism 110 whereby rotation of locking knob 112 can be used to clamp the guide rail yoke 111 and maintain a predetermined relative angular position of guide rails 26, 28 with respect to the work by rotation of locking knob 112 as best illustrated in FIG. 9. Locking mechanism 110 includes a threaded member 115, biased by spring 113. Threaded members 117 (only one of which is shown in FIG. 9) bias the lock plates 125, 126 open by means of springs 119 (only one of which is shown in FIG. 9). Lock plate 126 is integral with or fastened to yoke 111. By rotating locking knob 112, the threaded member 115 passing through bore 123 in lock plate 126 will draw lock plates 125, 126 together to cause clamping of yoke 111 to peripheral scale 76 drawing yoke 111 radially inward toward pivot point P while at the same time bowing guide rails 26, 28 upwardly.

In addition to, or in lieu of, the peripheral scale 76, the portable table can be provided with protractor 114 which may be used to align the cutting element of the power tool by longitudinal movement of the cutting tool support 38 along guide rails 26, 28 so as to overly protractor 114 in the correct angular orientation. Locking knob 112 can be engaged when the desired angular orientation is set, thus locking guide rails 26, 28 in the desired angular orientation. Power tool support 38 can then be retracted away from removable fence 18, the work placed against removable fence 18 and the power tool support means carrying the power tool and cutting element can be moved against the work so as to sever the work in the desired angular orientation. As shown in FIGS. 1 and 6, removable fence sections 20, 22 can be retained on base 14 by means of retaining elements 116, 118, 120 and 122. However, suitable alternative methods of retaining fence sections 20, 22 can include tongue-and-groove or dovetailed joints (not shown). Fixed fence 16 is retained in relation to base 14 by means of retaining elements 124, 126.

In operation of the table of the present invention, it is to be understood that the work may be placed against removable fence 18, and cross-cut at various angles of up to about 60 degrees from normal to the grain of the work by pivoting guide rails 26, 28 to the correct angular orientation to removable fence 18. However, in the event that it is desired to cross-cut the work to an even greater angle, i.e., on the order of about 80 degrees, removable fence sections 20, 22 can be removed from base 14 and the workpiece placed directly against fixed fence 16. By providing slot 128 in base 14, guide rails 26, 28 can be rotated to a position greater than 80 degrees relative to the grain of the workpiece. Slot 128 permits counterbalance 92 and guide rails 26, 28 to rotate to a position so that such cuts can be easily accomplished. Slot 128 as well as slot 130 permits rotation of guide rails 26, 28 to a position parallel to fixed fence 16 and removable fence 18 for easy storage of the portable table.

During use, the cutting element usually passes over pivot point P between removable fence sections 20, 22 so as not to cut the fence sections 20, 22. Thus, these sections 20, 22 have a long life. However, in using fixed fence 16, the saw blade or other cutting element will likely engage this fixed fence. Thus, the fixed fence is a disposable element formed of a relatively inexpensive material such as wood. Removable fence 18 may be made of high quality wood, metal or plastic material.

Because the power tool support 38 is preferably square, it can be removed from the guide rails 26 and 28 and rotated 90° so as to permit ripping of work along its length. As before, the power tool support 38 (rotated 90° from the position illustrated in FIG. 1) is moved along guide rails 26, 28 in a desired location with regard to either the fixed fence 16 or the removable fence 18 fixed in position by tightening nuts 56 and bolts 54 and the work passed beneath the cutting tool (not shown). It is to be understood that power tool support support 38 can be shaped so as to engage with the guide rails 26, 28 in either or both the cross-cut and ripping orientations.

Although the foregoing description describes severing of the workpiece, it is to be understood that the position of the cutting element, e.g., saw blade (not shown) or router bit (not shown) can be adjusted relative to base 14 by means of elements 62, 64 so as to perform common cutting techniques, e.g., rabbeting of the workpiece.

From the foregoing description of the invention, it should be understood that suitable alternative elements can be substituted for those disclosed without departing from the invention which is limited only by the scope of the appended claims.

I claim:

1. A portable work table comprising:
   a base having a peripheral edge;
   a plurality of legs supporting said base;
   at least one fence mounted on said base;
   a power tool support means;
   means for guiding said power tool support means positioned above said base and mounted for movement along the periphery of said base;
   counterbalance means positioned below said base and pivotable about a pivot point, said counterbalance means being sized and shaped so that one end thereof terminates radially inwardly of said peripheral edge of the base; and
   means connecting said guiding means and another end of the counterbalance means whereby said guiding means becomes pivotable about the same pivot point as said counterbalance means.

2. The portable work table of claim 1, wherein the position of the guiding means relative to the base is adjustable for elevation.

3. The portable work table of claim 1, wherein said means for guiding comprises two spaced parallel rails, including a yoke connecting said rails, said table including a peripheral member means and means to clamp said yoke to said peripheral member means so as to maintain the guiding means in fixed angular orientation relative to said at least one fence.

4. The portable work table of claim 1 including a removable fence positioned above said pivot point and a fixed fence parallel to said removable fence but displaced from said pivot point.

5. The portable work table of claim 1 including at least one low friction, tough thruster mounted on said counterbalance means adjacent said one end for bearing on the underside of said base.

6. A portable work table comprising:
   a base;
   a plurality of legs supporting said base;
   a power tool support means, said power tool support means defining an opening through which a cutting element of a power tool may project;
   means for guiding said power tool support means, said means for guiding being adapted to traverse the base from one edge to an opposite edge;
   said means for guiding being pivotable about a pivot point intermediate said one and opposite edges whereby a cutting element of a power tool may be guided over said pivot point;
   a removable fence positioned at said pivot point;
   a fixed fence positioned proximate an edge of said base parallel to said removable fence but displaced from said pivot point, said means for guiding being pivotable beyond the edge of said removable fence.

7. The portable work table of claim 6, wherein the position of the guiding means relative to the table is adjustable for elevation.

8. The portable work table of claim 6, wherein said means for guiding comprises two spaced parallel rails, including a yoke connecting said rails, said table including a peripheral member means and means to clamp said yoke to said peripheral member means so as to maintain the means for guiding in fixed angular orientation relative to at least one of the removable or fixed fences.

9. The portable work table of claim 8, wherein said means to clamp comprise two plates biased apart and a threaded means to draw said plates together.

10. The portable work table of claim 6 including a counterbalance positioned below said base and pivotable about a pivot point, said counterbalance being adjustably connected to said means for guiding.

11. The portable work table of claim 10 including at least one low friction, tough thruster mounted on said counterbalance for bearing on the underside of said base.

12. A portable work table comprising:
    a base, the shape of said base being defined at least in part by the periphery of a circle generated by rotating a radius about a pivot point and a chord joining the 0° and 270° points of said circle;
    a plurality of legs supporting said base;
    a counterbalance pivotable about said pivot point;
    a power tool support containing an aperture;
    a guide means for said power tool support;
    said guide means permitting reciprocation of the power tool support over said pivot point;
    a removable fence positioned at said pivot point;
    said counterbalance and said guide means being adjustably connected to one another;
    a fixed fence mounted on the chord defining an edge of said base in a position parallel to said removable fence but spaced from said pivot point; and a means to lock said guide means in a predetermined angular position relative to at least one of said removable and fixed fences.

13. The portable work table of claim 12, wherein the position of the guide means relative to the table is adjustable for elevation.

14. The portable work table of claim 12, wherein said guide means comprises two spaced parallel rails, including a yoke connecting said rails, said table including a peripheral member means and means to clamp said yoke to said peripheral member means so as to maintain the guide means in fixed angular orientation relative to at least one of said fixed and removable fences.

15. The portable work table of claim 14, wherein said parallel rails have a generally C-shaped cross-section, a flange extending from the bottom of said C-shape and said flange contains an upstanding rib.

16. The portable work table of claim 15, wherein the power tool support is shaped so as to complement the shape of said parallel rails so as to be slidable along said parallel rails.

17. The portable work table of claim 12 in which the removable fence positioned at said pivot point has an opening permitting passage of a cutting element of a power tool carried by the power tool support whereby the cutting element may traverse the removable fence without contacting said removable fence.

18. The portable work table of claim 12 including at least one low friction, tough thruster mounted on said counterbalance for bearing on the underside of said base.

19. The portable work table of claim 12, wherein said means to lock comprise two plates biased apart and a threaded means to draw said plates together.

20. The portable work table of claim 12 including at least one slot in said base to permit the guide means to lay parallel to said movable fence.

21. A portable work table comprising:
a base, the shape of said base being defined at least in part by the periphery of a circle generated by rotating a radius about a pivot point and a chord joining the 0° and 270° points of said circle;
a plurality of legs supporting said base;
a counterbalance pivotable about said pivot point;
a power tool support containing an aperture;
a guide means for said power tool support;
said guide means permitting reciprocation of the power tool support over said pivot point;
a removable fence positioned at said pivot point;
said counterbalance and said guide means being adjustably connected to one another;
a fixed fence mounted on said base, nearer the chord than the pivot point, in a position parallel to said removable fence but spaced from said pivot point; and
a means to lock said guide means in a predetermined angular position relative to at least one of said removable and fixed fences.

* * * * *